US008593452B2

(12) United States Patent
Solem et al.

(10) Patent No.: US 8,593,452 B2
(45) Date of Patent: Nov. 26, 2013

(54) FACE FEATURE VECTOR CONSTRUCTION

(75) Inventors: Jan Erik Solem, San Francisco, CA (US); Michael Rousson, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/332,084

(22) Filed: Dec. 20, 2011

(65) Prior Publication Data
US 2013/0155063 A1   Jun. 20, 2013

(51) Int. Cl.
*G06T 15/00*   (2011.01)

(52) U.S. Cl.
USPC ............................... 345/419; 345/582

(58) Field of Classification Search
USPC ................................. 345/419, 582
See application file for complete search history.

(56) References Cited

U.S. PATENT DOCUMENTS

| | | |
|---|---|---|
| 2006/0039600 A1 | 2/2006 | Solem et al. |
| 2008/0013798 A1* | 1/2008 | Ionita et al. ............... 382/118 |
| 2010/0209000 A1* | 8/2010 | Usui et al. ................. 382/195 |
| 2011/0078097 A1* | 3/2011 | Thornton et al. ........... 706/12 |
| 2011/0080402 A1 | 4/2011 | Netzell et al. |
| 2011/0081074 A1 | 4/2011 | Rousson et al. |

FOREIGN PATENT DOCUMENTS

| | | |
|---|---|---|
| EP | 1615160 | 1/2006 |
| WO | 2009030636 | 3/2009 |

OTHER PUBLICATIONS

Tistarelli, Massimo. "Introductions to Face Recognition." Computer Vision Laboratory: University of Sassari—Italy. pp. 1-129.
Beumer, G.M., Q. Tao, A.M. Baze and R.N.J. Veldhuis. "Comparing Landmarking Methods for Face Recognition." University of Twente, EEMSC, Signals & Systems. Enschede, The Netherlands. pp. 594-597.
Huang, Jennifer. "Component-based Face Recognition with 3D Morphable Models." MIT Thesis. Dec. 17, 2002. pp. 1-38.
Fodor, Imola K. "A Survey of Dimension Reduction Techniques." Center for Applied Scientific Computing, Lawrence Livermore National Laboratory, Livermore, CA. Jun. 2002. pp. 1-18.
Monzo, David, Alberto Albiol, Antonio Albiol and Jose M. Mossi. "A Comparative Study of Facial Landmark Localization Methods for Face Recognition using HOG Descriptors." 2010 International Conference on Pattern Recognition. IEEE. pp. 1330-1333.
Aly, Mohamed. "Face Recognition Using SIFT Features." CNS186 Term Project Winter 2006. CalTech. pp. 1-7.
Cao, Zhimin, Qi Yin, Xiaoou Tang and Jian Sun. "Face Recognition with Learning-based Descriptor." http://www.jdl.ac.cn/project/faceId/paperreading/Paper/sfxie_20100430.pdf pp. 1-8.

(Continued)

*Primary Examiner* — Maurice L McDowell, Jr.
(74) *Attorney, Agent, or Firm* — Wong, Cabello, Lutsch, Rutherford & Brucculeri, LLP (57) ABSTRACT

Systems, methods, and computer readable media for determining and applying face recognition parameter sets are described. In general, techniques are disclosed for identifying and constructing a unique combination of facial recognition discriminators into a "face feature vector" that has been found to be more robust (e.g., stable to image noise, a person's pose, and scene illumination) and accurate (e.g., provide high recognition rates) than prior art techniques. More particularly, a face feature vector may be generated by the combination of shape descriptors (e.g., as generated by two-dimensional and three-dimensional shape models) and texture descriptors (e.g., as generated by global and local texture models).

19 Claims, 8 Drawing Sheets

(56) References Cited

OTHER PUBLICATIONS

Kim, Kyungnam. "Face Recognition Using Principle Component Analysis." http://www.umiacs.umd.edu/~knkim/KG_VISA/PCA/FaceRecog_PCA_Kim.pdf pp. 1-7.

Davis, Jason V., Brian Kulis, Suvrit Sra and Inderjit Dhillon. "Information-Theoretic Metric Learning." The University of Texas at Austin. Dec. 9, 2006. pp. 1-34.

"Mahalanobis distance." http://en.wikipedia.org/wiki/Mahalanobis_distance pp. 1-5.

Vese, Luminita A. and Stanley J. Osher. "Modeling Textures with Total Variation Minimization and Oscillating Patterns in Image Processing." Plenum Publishing Corp. 2003. pp. 553-572.

Liu, Congxin, Jie Yang and Hai Huang. "P-SURF: A Robust Local Image Descriptor." Journal of Information Science and Engineering. pp. 1-15.

Oberti, F., A. Teschioni and C.S. Regazzoni. "Roc Curves for Performance Evaluation of Video Sequences Processing Systems for Surveillance Applications." DIBE—University of Genoa—Via Opera Pia 11a, I-16145 Genoa (Italy). pp. 1-5.

International Search Report and Written Opinion received in corresponding PCT Application No. PCT/US2012/055447, dated May 28, 2013.

"Face Modeling" In: Kim & Sung: "Automated Face Analysis Emerging Technologies and Research," Jan. 1, 2009, Information Science reference, Hershey, PA (US), XP002697297, pp. 45-91.

Extended European Search Report received in corresponding EP Application No. 12186709.7, dated May 28, 2013.

Examination Report received in AU Application No. 2012227166, dated Jul. 31, 2013.

* cited by examiner

FACE FEATURE VECTOR CONSTRUCTION

BACKGROUND

This disclosure relates generally to the field of face recognition. More particularly, this disclosure describes a number of techniques for combining multiple types of face recognition descriptors into a single entity—a face feature vector. Face feature vectors may be used in face recognition applications. Examples of such applications include, but are not limited to, managing, sorting and annotating images (still and video) in iPhoto® and Aperture®. (IPHOTO and APERTURE are registered trademarks of Apple Inc.)

In general terms, face recognition operations scan a person's face, extract or detect a specified set of parameters therefrom, and match those parameters against a library of known facial data to which identification has been previously assigned or is otherwise known. The data set to which a new image's parameters are compared is often times characterized or described by a model. In practice, these models define groups of parameter sets where all images falling within a given group are classified as belonging to the same person.

To be robust (e.g., stable to image noise, a person's pose, and scene illumination) and accurate (e.g., provide high recognition rates) the specified parameter sets need to encode information that describes a face in a way that is repeatable and invariant to typical intra-person variability while at the same time being able to discriminate a one person from another. This need is a central problem encountered by all face recognition systems. Thus, it would be beneficial to identify a mechanism (methods, devices, and systems) to define a set of parameters that provide robust and accurate face recognition.

SUMMARY

In various embodiments, the invention provides an apparatus (e.g., a personal computer), a method, and computer program code to generate a novel face feature vector that may be used to identify faces detected in a digital image. The method includes performing (or executing) computer program code to obtain landmark detection information for a first face in a first image (e.g., via face detection techniques). The landmark detection information may be applied to first and second shape models to generate first and second shape feature vectors and to first and second texture models to generate first and second texture feature vectors. All four of these feature vectors may be combined to provide the form the face feature vector.

In one embodiment, the first shape model is a two-dimensional shape model of the detected face while the second shape model is a three-dimensional shape model of the detected face. First and second shape models may be linear or non-linear independently of one another.

In another embodiment, the landmark detection information may be normalized before being used to generate the first and second texture feature vectors. In some embodiments, the first texture feature vector may be based on identified regions within the normalized landmark detection information (the regions including less than all of the normalized landmark detection information).

In still another embodiment, a morphing operation may be applied to the normalized landmark detection information before it is used to generate the second texture feature vector.

In yet another embodiment, by comparing two such face feature vectors a similarity measure may be determined. This similarity measure can be used to determine if the two face feature vectors likely represent the same face. In this and similar embodiments, the similarity measure may be based on the Mahalanobis distance measure.

DETAILED DESCRIPTION

This disclosure pertains to systems, methods, and computer readable media for determining and applying face recognition parameter sets. In general, techniques are disclosed for identifying and constructing a unique combination of facial recognition discriminators into a "face feature vector" that has been found to be more robust (e.g., stable to image noise, a person's pose, and scene illumination) and accurate (e.g., provide high recognition rates) than prior art identification approaches. More particularly, a face feature vector may be generated by the combination of shape and texture descriptors. In one implementation, the face feature vector includes information describing a face's two-dimensional (2D) shape, its three-dimensional (3D) shape, its overall or global texture, and details or local texture information (e.g., skin color).

In the following description, for purposes of explanation, numerous specific details are set forth in order to provide a thorough understanding of the inventive concept. As part of this description, some of this disclosure's drawings represent structures and devices in block diagram form in order to avoid obscuring the invention with details that would be known to those of ordinary skill in the art. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the facial recognition field having the benefit of this disclosure.

Figure 1:
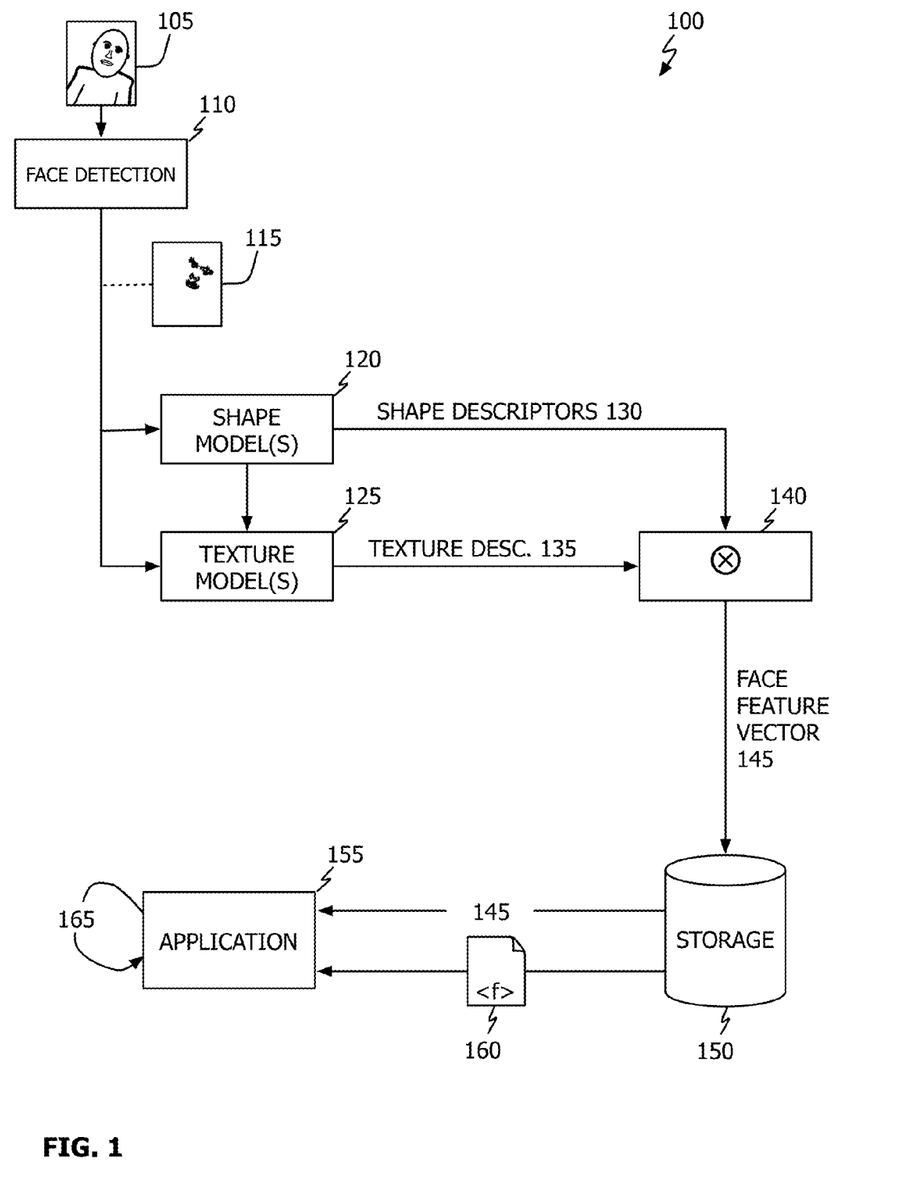
FIG. 1 shows, in block diagram form, a face feature vector generation and run-time face identification operation in accordance with one embodiment.

Referring to FIG. 1, face feature vector generation and run-time face identification operation 100 in accordance with one embodiment is shown in block diagram form. To start, input image 105 is processed in accordance with face detector 110 to generate landmark image 115. As used herein, the phrase "landmark image" refers to an image of a face in which landmark points have been detected. Landmark features may include the location of one or more facial features such as the eyes, eyebrows, nose, mouth and cheek. Input image 105 may, for example, be an image obtained from a digital still or video camera. Face detector 110 may use any methodology appropriate to the designer's goals/constraints. Illustrative face detection techniques include, but are not limited to, knowledge-based, feature invariant, template matching and appearance-based methods. As the precise method to detect faces is not pivotal to the following discussion, no more about this operation will be described herein. While not so limited, in one embodiment landmark image 115 may be a grayscale image within which the detected features are prominent. For simplicity of presentation it will be assumed in the following that an input image (e.g., image 105) includes only a single face. It should be understood, however, no such limitation is inherent in the disclosed techniques.

Landmark image 115 may be applied to one or more shape models 120 and one or more texture models 125. As shown, shape models 120 generate shape descriptors 130 and texture models 125 generate texture descriptors 135. It should be recognized that shape and texture models 120 and 125 are typically generated offline using a library of known images and may be linear or non-linear independently of one another. These models may also include so called "geometry constrained part-based models" where landmark points have their own appearance model. Descriptors 130 and 135 may be combined in accordance with block 140 in any fashion that satisfies the developer's goals and/or constraints. By way of example, operation 140 may concatenate each of the supplied shape and texture descriptors. In another embodiment, operation 140 may generate a set of linear combinations of the descriptor elements. In yet another embodiment, shape descriptors 130 may be combined in one manner and texture descriptors 135 in a different manner, with the combination of each concatenated. In yet another embodiment, one or more descriptors may be combined as generated by their respective models while other descriptors may undergo additional processing before being combined (e.g., dimensional reduction, smoothing and the like). However combined, the result of operation 140 is face feature vector 145. Face feature vector 145 may be retained in storage 150 (e.g., non-transitory magnetic or solid-state disk units). As a practical matter, face feature vector 145 may be incorporated within input image 105 (e.g., in its metadata) and/or retained in a separate data store that references image 105.

Once generated, face feature vector 145 may be used by application 155 to identify the corresponding image's face (e.g., within image 105). For example, application 155 may retrieve image 160 whose associated face feature vector <f> is associated or identified with face 'F'. Once retrieved, face feature vector 145 may be compared 165 to face feature vector <f> and, if the two are sufficiently similar (e.g., through some convenient measure), image 105 may be said to include face 'F'. In one embodiment, application 155 may be a user-level graphics application (e.g., iPhoto or Aperture). In another embodiment, application 155 may be incorporated within a face recognition framework that may be used by user-level applications. In yet another embodiment, some or all of application 155 may be incorporated within specialized image processing hardware.

Figure 2:
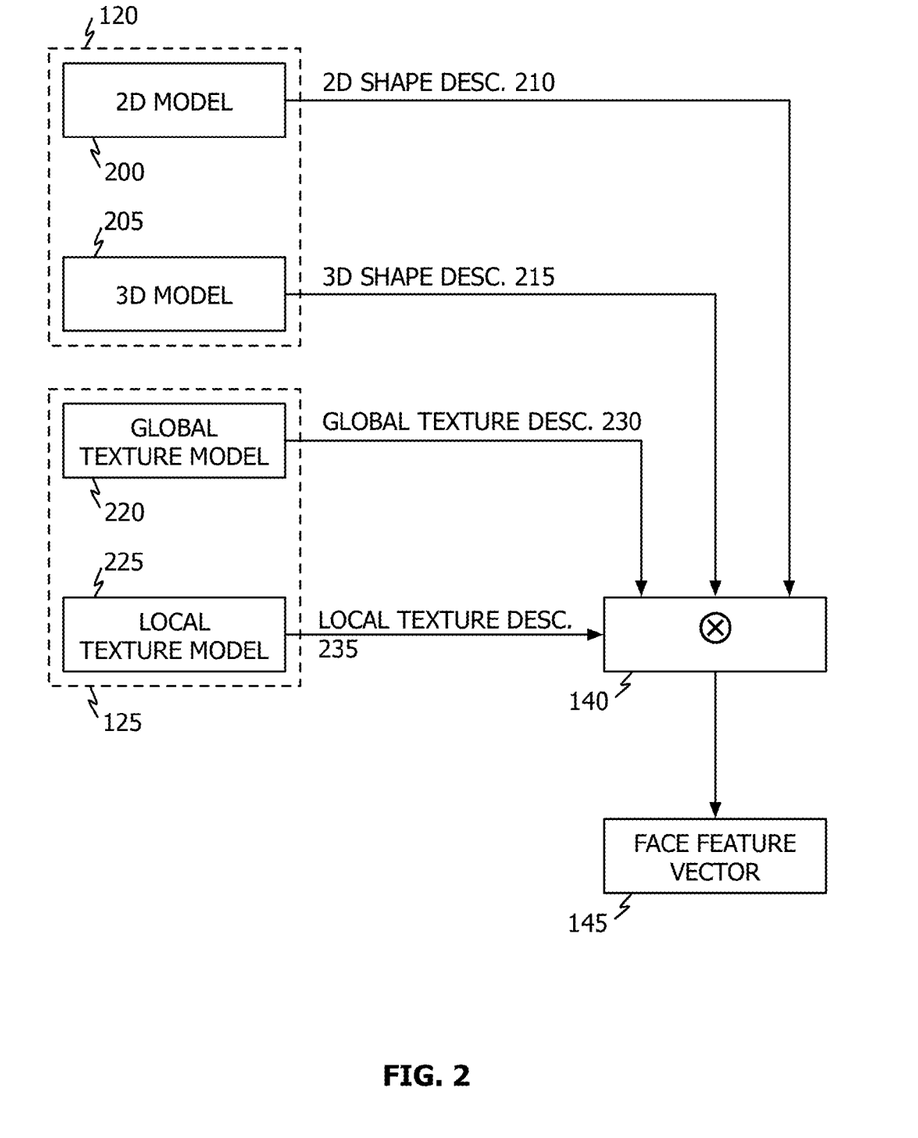
FIG. 2 shows, in block diagram form, the composition of shape and texture models in accordance with one embodiment.

Referring to FIG. 2, shape models 120 may be seen to include two-dimensional (2D) 200 and three-dimensional (3D) 205 models (which generate 2D and 3D shape descriptors 210 and 215 respectively) while texture models 125 include global texture 220 and local texture 225 models (which generate global and local texture descriptors 230 and 235 respectively).

In one embodiment, 2D, 3D, and global texture models 200, 205 and 220 may be linear models of the form:

$$\vec{i} = B\vec{c} + \vec{m}, \quad \text{EQ. 1}$$

where $\vec{i}$ represents an image or image points (depending upon whether the model is a shape model or a texture model), B represents a set of basis vectors (generally orthogonal), $\vec{c}$ represents a set of model coefficients, and $\vec{m}$ represents a mean shape or texture vector (depending upon whether the model is a shape model or a texture model). Given a set of (training) images, basis vectors B and mean shape/texture vector $\vec{m}$ may be determined using any number of techniques such as, for example, Principal Component Analysis (PCA), Independent Component Analysis (ICA), Linear Discriminant Analysis (LDA), Elastic Bunch Graph Matching (EBGM), Trace transform, Active Appearance Model (2M), Bayesian Framework, Support Vector Machine (SVM), Hidden Markov Models (H8), and Eigenfaces. The number of basis vectors comprising B determines, to a degree, the accuracy of the model. Thus, the size of B may be selected by the designer to achieve a desired accuracy. In one implementation, 10 basis vectors may be sufficient while in another implementation 20, 50 or 75 basis vectors may be needed.

Figure 3:
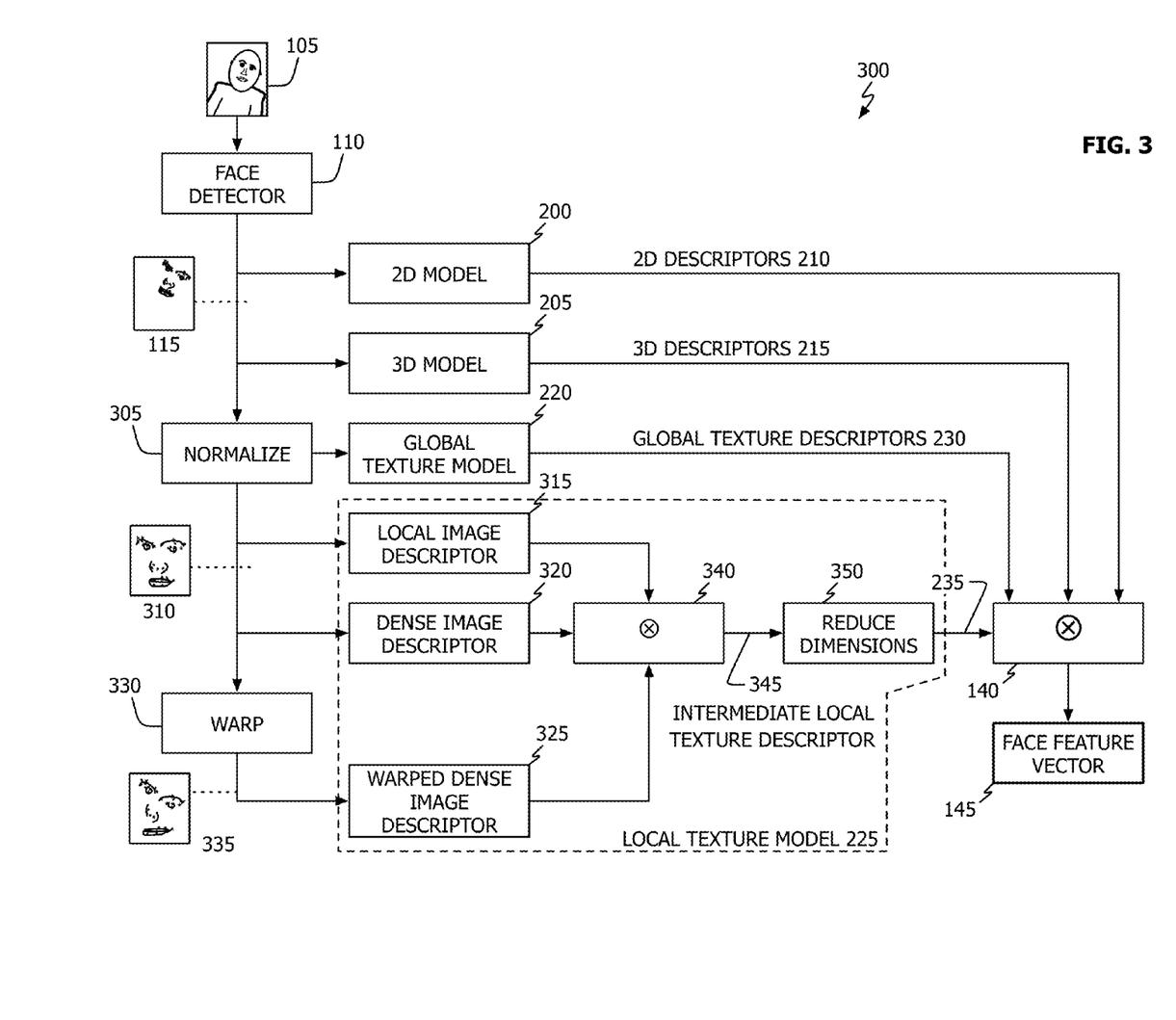
FIG. 3 shows, in block diagram form, a face feature vector generation operation in accordance with another embodiment.

Referring to FIG. 3, a block diagram for one embodiment of face feature vector construction operation 300 is shown. As described above with respect to FIGS. 1 and 2, input image 105 is provided to face detector 110 which generates landmark image 115. In the illustrated embodiment, landmark image 115 may be supplied directly to 2D and 3D shape models 200 and 205. Assuming these models may be characterized by EQ. 1, then for 2D shape model 200, $\vec{i}$ represents landmark image 115, B represents a set of 2D model basis vectors, $\vec{c}$ represents a set of 2D model coefficients (i.e., 2D descriptors 210), and $\vec{m}$ represents a mean 2D shape vector. Similarly, for 3D shape model 205, $\vec{i}$ also represents landmark image 115, B represents a set of 3D model basis vectors, $\vec{c}$ represents a set of 3D model coefficients (i.e., 3D descriptors 215), and $\vec{m}$ represents a mean 3D shape vector.

Landmark image 115 may next undergo normalization operation 305 to generate normalized image 310. It will be understood by those of ordinary skill in the art that normalization operation 300 refers to a process wherein an image's landmark features (e.g., eyebrows, eyes, nose, mouth and chin) may be adjusted to appear in specified locations within a given size frame.

Once normalized, image 310 may be supplied to global texture model 220 to generate global texture descriptors 230. If EQ. 1 characterizes global texture model 220, then $\vec{i}$ represents normalized image 310, B represents a set of texture model basis vectors, $\vec{c}$ represents a set of texture model coefficients (i.e., global texture descriptors 240), and $\vec{m}$ represents a mean texture vector.

Having determined basis vectors (B) and mean vectors ($\vec{m}$) for 2D, 3D and global texture models 200, 205 and 220 offline and stored them for run-time use, model coefficients (representing 2D, 3D, and global texture descriptors 210, 215, and 230) may be determined by solving for $\vec{c}$ in EQ. 1. A straight forward algebraic solution to EQ. 1 to determine $\vec{c}$ may not be available as B is not necessarily a square matrix. Accordingly, $\vec{c}$ may be determined at run-time in accordance with any one of a number of optimization procedures. One such procedure is to evaluate the following relationship:

$$\min \| \vec{i} - (B\vec{c} + \vec{m}) \|. \qquad \text{EQ. 2}$$

By way of example, it can be seen from EQ. 1 that if landmark image 115 and normalized image 305 are each represented by a (128×128) array of elements, $\vec{i}$ is a (16,384×1) vector. Further, if 'n1' represents the number of basis vectors in B, then B is a (16,384×n1) matrix and $\vec{m}$ is a (16,384×1) vector. In this example, 2D, 3D and global texture descriptors 210, 215 and 230 are (n1×1) vectors. In one embodiment, 3D model coefficients may be obtained using the technique described in pending U.S. patent application Ser. No. 13/299,211, entitled "3D Object Recognition."

Referring again to FIG. 3, normalized image 310 may also be provided to local texture model 225. As illustrated, local texture model 225 may itself include local image descriptor 315, dense image descriptor 320, and warped dense image descriptor 325.

Figure 4A:
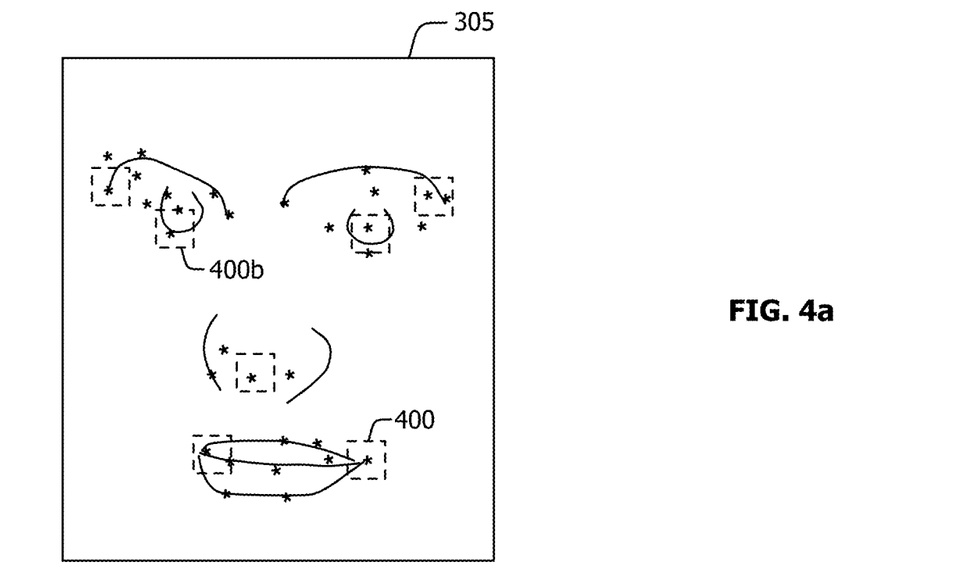
FIGS. 4a and 4b illustrate local image and dense image descriptor operations in accordance with one embodiment.
Figure 4B:
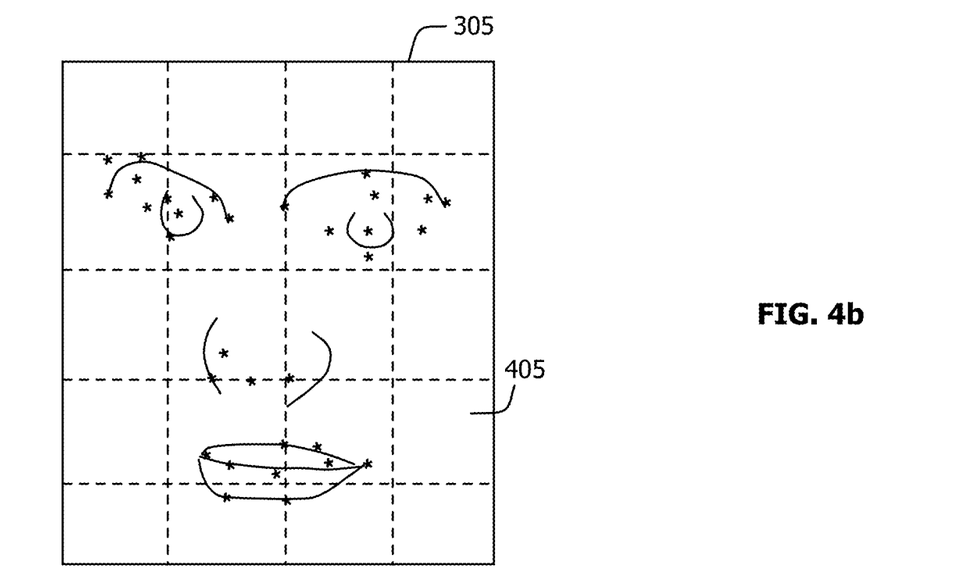

Referring to FIG. 4a, in one embodiment local image descriptor 315 is based on the texture of a small region or tile 400 around one or more of the landmark features (only one of the illustrative regions is enumerated in FIG. 4a). While the precise number of tiles depends upon the image resolution and the designer's goals/constraints, 10 to 20 tiles for a (128×128) normalized image has been found to be sufficient. The size of each tile may be determined based on training data and can vary in a fixed number of scales, where each point may also have multiple tiles of different size. It will be understood that the actual settings used can be based on what gives the best recognition performance (within established design constraints). By way of example, local image descriptor may be generated in accordance with vector gradient operators such as the Histogram of Gradients (HoG), Speeded Up Robust Feature (SURF), Scale-Invariant Feature Transform (SIFT), Binary Robust Independent Elementary Features (BRIEF), and Oriented BRIEF (ORB) or similar types of descriptors. Referring to FIG. 4b, in one embodiment dense image detector 320 determines an image descriptor based on the entire image. For example, a selected detector operation (e.g., HoG or SIFT) may be applied to each of a plurality of regions that cover image 305 (e.g., 20 regions 405 such as in a 5×4 grid). The result of local image detector 315 is an j-element descriptor. The result of dense image detector is a k-element descriptor.

While both local image descriptor 315 and dense image descriptor 320 have been described as using gradient vector descriptors, this is not necessary. Other descriptors may also be used such as, for example, intensity based descriptors and image texture bases. In addition, local image detector 315 may use one approach (e.g., intensity) and dense image detector 320 another approach (e.g., gradient vector).

Figure 5:
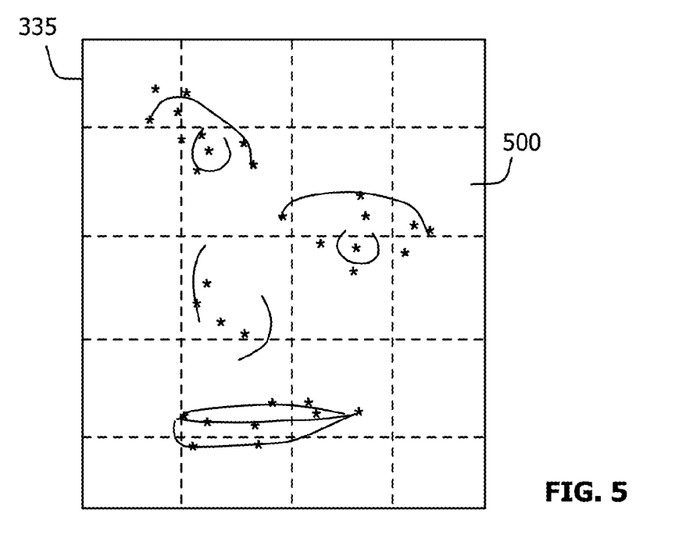
FIG. 5 illustrates a warped image and dense detector regions in accordance with one embodiment.

In addition to using normalized image 310 directly, local texture model 225 may also use a warped version of image 310. Referring again to FIG. 3, normalized image 310 can be applied to warp or morph operator 330 to generate warped or morphed image 335. In one embodiment, warp operator 330 adjusts the face for out-of-plane rotation such that warped image 335 approximates a full frontal view of the subject's face. Referring to FIG. 5, similar to the operation described for generating dense image descriptor 320, the entirety of warped image 335 may be evaluated in regions (e.g., 500) as described above with respect to dense texture descriptor 320. In one embodiment, the warped dense image descriptor is a l-element descriptor. While the operations may be similar, it is not necessary that the warped dense image descriptor 325 use the same technique, or the same number of regions/tiles, as is used to generate dense image descriptor 320.

Returning again to FIG. 3, combine operation 340 may combine any two, three, or any combination of the generated local image, dense image and warped dense image descriptors to generate intermediate local texture descriptor 345. Combine operation 340 may take each descriptor in its entirety or just a portion of each descriptor, or one descriptor in its entirety and only a portion of another. Continuing the numeric example begun above (see paragraph [0030]), combine operation 340 may be a concatenation of each of the local image descriptor (j-elements), the dense image descriptor (k-elements), and the warped dense image descriptor (l-elements). In an embodiment such as this, the size of intermediate local texture descriptor 345 is (j+k+l). In one implementation, (j+k+l)≈3,000.

To reduce the size of this descriptor to a value that is more easily manipulated in real-time, dimensional reduction operation 350 may be performed to generate local texture descriptor 235. Alternatively, dimensionality reduction may be performed on the individual components (315,320,325) prior to their combination at 340. Dimensional reduction CAN be viewed as a transformation that may be expressed as follows:

$$\vec{y} = M\vec{x}, \qquad \text{EQ. 3}$$

where $\vec{y}$ represents local texture descriptor 235, M represents a set of basis vectors (generally orthogonal) that perform the desired transformation, and $\vec{x}$ represents intermediate local texture descriptor 345. Knowing the distribution of $\vec{y}$ for a large set of faces, one can identify and retain a smaller number of elements (dimensions) to represent substantially the same information. Transformation matrix M may be determined offline using any of a number of known optimization techniques (e.g., metric learning, feature selection, or principal component analysis). Once determined, M may be stored for use at run-time. Continuing with the numeric example started above, if intermediate local texture vector 345 ($\vec{x}$) has 3,000 elements and M reduces this dimensionality down to n2 dimensions: $\vec{y}$ is a (n2×1) vector, M is a (n2×3,000) matrix, and $\vec{x}$ is a (3,000×1) vector.

Figure 6:
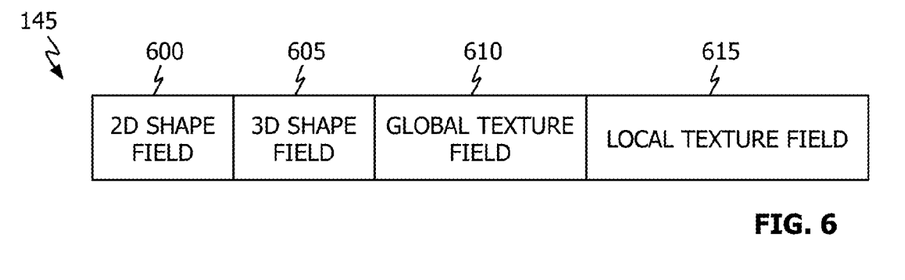
FIG. 6 shows the structure of a face feature vector in accordance with one embodiment.

Returning once again to FIG. 3, after each of the descriptors 210, 215, 230 and 235 has been determined, they may be combined in accordance with operator 140 to produce face feature vector 145. As shown in FIG. 6, face feature vector may include fields for the 2D shape descriptor 210 (600), 3D shape descriptor 215 (605), global texture descriptor 230 (610), and local texture descriptor 235 (615).

Referring again to the numeric example started above, if 2D model 200, 3D model 205 and global texture model 220 are linear models of the form given by equation 1, and model input images are composed of (128×128) elements, and there are n1 basis vectors in each of the 2D, 3D and global texture models, then illustrative model parameters are as shown in Table 1.

TABLE 1

Illustrative Model Parameter Sizes

| Model | B | $\vec{c}$ | $\vec{m}$ |
|---|---|---|---|
| 2D Shape 200 | 16,384 × n1 | n1 × 1 | 16,384 × 1 |
| 3D Shape 205 | 16,384 × n1 | n1 × 1 | 16,384 × 1 |
| Global Texture 220 | 16,384 × n1 | n1 × 1 | 16,384 × 1 |

Further, if the combination of local image detector 315, dense image detector 320 and warped dense image detector 320 generates an intermediate local texture descriptor 345 having 3,000 elements, dimensional reduction operation 350 is characterized by EQ. 3, and reduces the number of dimensions to n2 dimensions, then illustrative model parameters for dimensional reduction operation 350 are as shown in Table 2.

TABLE 2

Illustrative Dimensional Reduction Parameter Sizes

| Model | $\vec{y}$ | M | $\vec{x}$ |
|---|---|---|---|
| Dimensional Reduction 350 | n2 × 1 | n2 × 3,000 | 3,000 × 1 |

Finally, if combination operator 140 concatenates each of 2D descriptors 210, 3D descriptors 215, global texture descriptors 230 and local texture descriptors 235, then face feature vector 145 is a ((3n1+n2)×1) vector.

Figure 7:
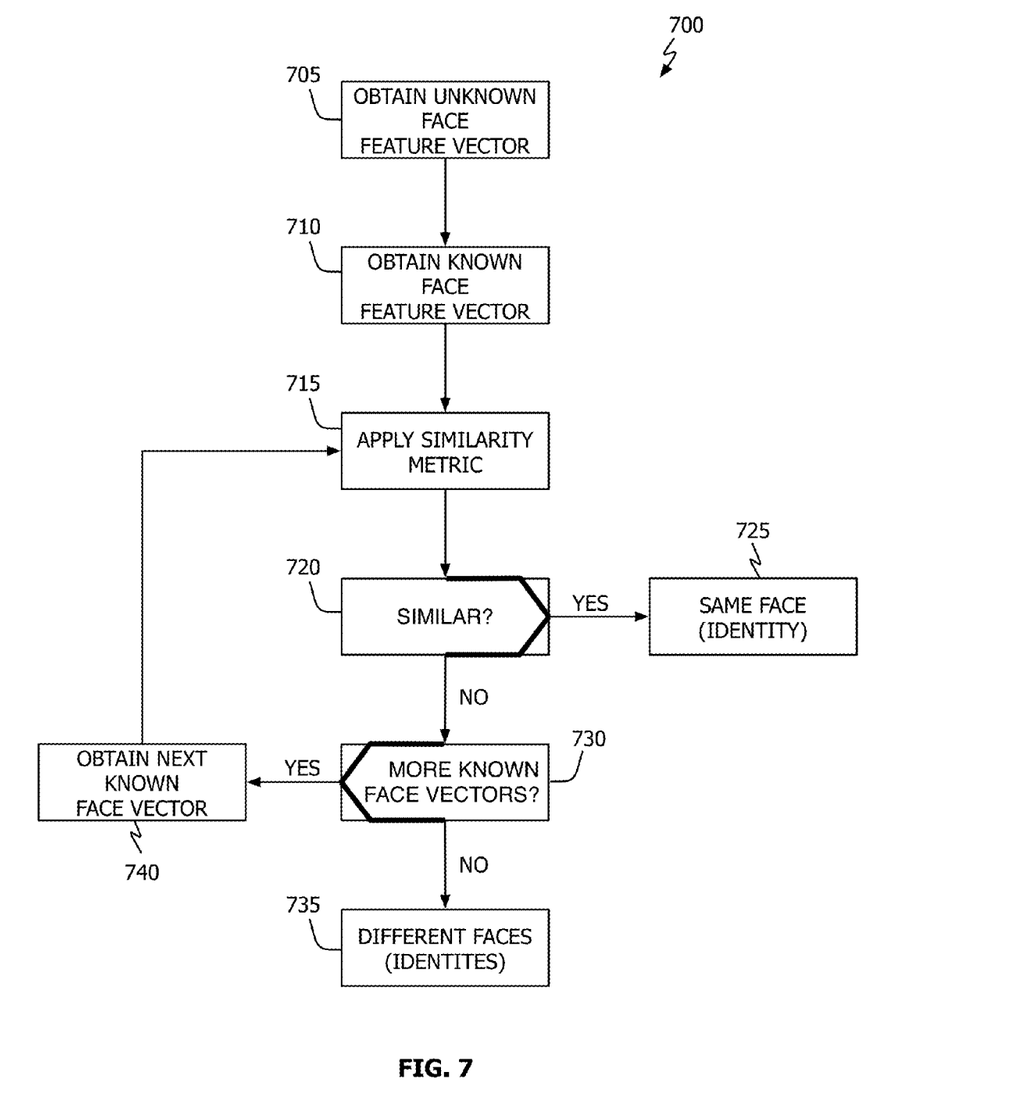
FIG. 7 shows, in flowchart form, a face identification operation in accordance with one embodiment.

Referring to FIG. 7, face identification operation 700 using face feature features in accordance with one embodiment is shown. To begin, face feature vectors for an unknown and known face/identity are obtained (blocks 705 and 710). A similarity metric may then be applied to these vectors (block 715) and a check made to determine if the metric indicates a match (block 720). If the two face feature vectors are similar enough (the "YES" prong of block 720), a determination that the unknown face feature vector represents the same identity associated with the known face feature vector can be made (block 725). If the two face feature vectors are not similar enough to indicate a match (the "NO" prong of block 720), a further check is made to determine if another known face feature vector is available (block 730). If there are no more face feature vectors associated with known identities (the "NO" prong of block 730), a conclusion can be made that the unknown face feature vector (i.e., obtained during acts in accordance with block 705) corresponds to an unknown face (block 735). If there are more face feature vectors associated with known identities (the "YES" prong of block 730), a "next" known face feature vector may be obtained from, for example, storage 150 (block 740), whereafter operation 700 resumes at block 715.

In one embodiment, the similarity metric (see block 715) may be a distance metric along the lines of a Hamming distance. For large dimensionality vectors, such as the face feature vectors described herein, a Mahalanobis distance measure as described in EQ. 4 has been found to provide an effective similarity measure.

$$S(\vec{x},\vec{y}) = (\vec{x}-\vec{y})^T W(\vec{x}-\vec{y}),$$ EQ. 4 where $\vec{x}$ represents a first face feature vector (e.g., one associated with an unknown face), $\vec{y}$ represents a second face feature vector (e.g., one associated with a known face), S( ) represents a similarity or comparison operation, and W represents a weight matrix. Essentially, weight matrix W identifies how important or significant each element in the face feature vectors are during the comparison operation. Using a large number of face feature vectors associated with known identities, metric learning techniques may be applied to determine W offline. Once known, W may be stored for run-time use in accordance with FIG. 7. By way of example, if face feature vectors have 500 elements, i.e., represented by (500×1) vectors, then W would be a (500×500) element weight matrix.

Figure 8:
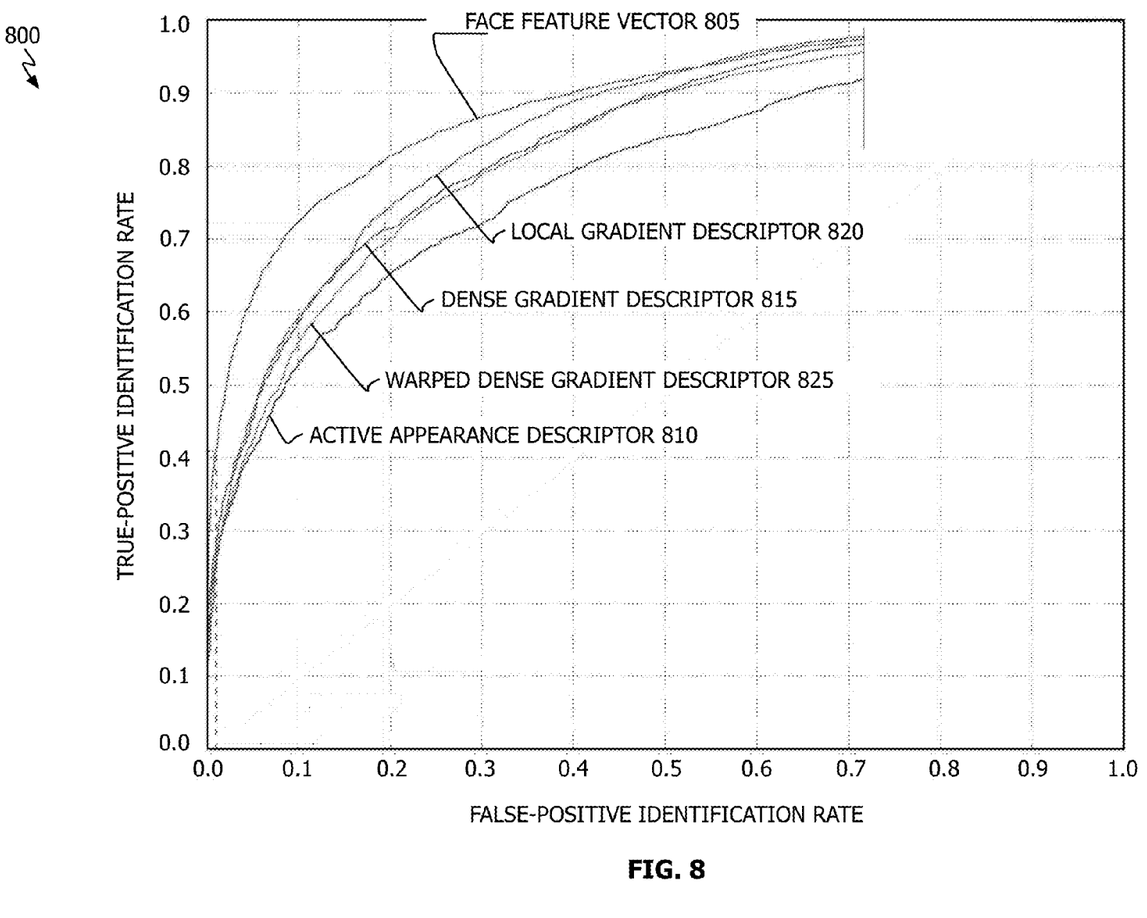
FIG. 8 shows an illustrative Receiver Operating Characteristic (ROC) curve illustrating the identification performance of the disclosed face feature vector in accordance with one embodiment.

Referring to FIG. 8, Receiver Operating Characteristic (ROC) curve 800 shows the performance of the face feature vector (805) as disclosed herein against the use of the individual components making up the face feature vector: (1) a standard 2M descriptor (810); dense gradient (815); local gradient (820); and warped dense gradient (825) descriptors alone. As can be seen, use of a face feature vector in accordance with this disclosure yields higher performance than these other descriptors.

Figure 9:
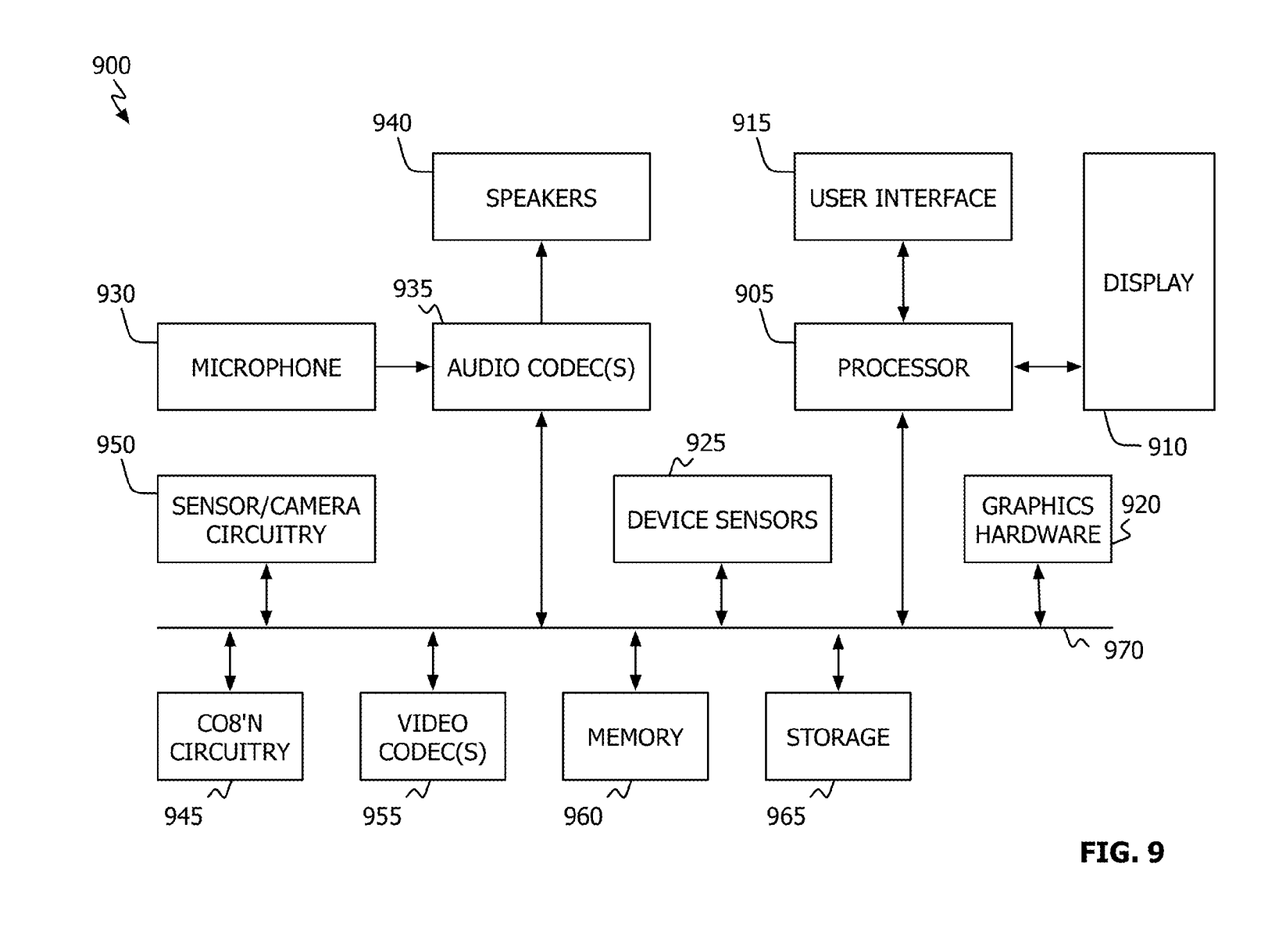
FIG. 9 shows, in block diagram form, an illustrative electronic device that may be used to implement one or more operations in accordance with this disclosure.

Referring now to FIG. 9, a simplified functional block diagram of illustrative electronic device 900 is shown according to one embodiment. Electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture unit 950, video codec(s) 955, memory 960, storage 965, and communications bus 970. Electronic device 900 may be, for example, a personal digital assistant (PDA), personal music player, mobile telephone, notebook, laptop or tablet computer.

Processor 905 may execute instructions necessary to carry out or control the operation of many functions performed by device 900 (e.g., such as face feature vector construction and run-time face identification operation 100 or face identification operation 700). Processor 905 may, for instance, drive display 910 and receive user input from user interface 915. User interface 915 may allow a user to interact with device 900. For example, user interface 915 can take a variety of forms, such as a button, keypad, dial, a click wheel, keyboard, display screen and/or a touch screen. Processor 905 may also, for example, be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable graphics processing unit (GPU).

Sensor and camera circuitry 950 may capture still and video images that may be processed, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905 and graphics hardware 920 to perform device functions. For example, memory 960 may include memory cache, read-only memory (ROM), and/or random access memory (RAM).

Storage 965 includes media for retaining audio, image and video files, computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to tangibly retain computer program instructions or code organized into one or more modules and written in any desired computer programming language. When executed by, for example, processor 905 such computer program code may implement one or more of the methods described herein.

Various changes in the materials, components, circuit elements, as well as in the details of the illustrated operational methods are possible without departing from the scope of the following claims. For instance, while the models described herein were linear in form, no such limitation is inherent in the disclosed techniques. Further, the various models may be different—some models may be linear while others non-linear. In addition, combination operations (e.g., 140 and 340) are not limited to concatenation operations, nor need they be the same. Any combination that is appropriate to the designer's goals may be used. For example, linear combinations, selection of subsets of descriptor values, and weighted combinations of same are all feasible. Also, if the dimensionality of model descriptors do not need dimensional reduction (e.g., operations 315, 320, and 325), this operation need not be performed.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium encoding instructions executable by a processor to:
   obtain landmark detection information for a first face in a first image;
   generate a first shape model feature vector based, at least in part, on the landmark detection information;
   generate a second shape model feature vector based, at least in part, on the landmark detection information;
   generate a first texture model feature vector based, at least in part, on the landmark detection information;
   generate a second texture model feature vector based, at least in part, on the landmark detection information;
   combine the first shape model feature vector, the second shape model feature vector, the first texture model feature vector and the second texture model feature vector to form a first face feature vector;
   store the first face feature vector in a storage device;
   retrieve the first face feature vector from the storage device;
   retrieve a second face feature vector from the storage device, wherein the second face feature vector corresponds to a known person;
   compare the first face feature vector and the second face feature vector to generate a similarity value;
   determine the first face corresponds to the known person if the similarity value indicates a match; and
   determine the first face does not correspond to the known person if the similarity value does not indicate a match.

2. The non-transitory computer readable medium of claim 1, wherein the instructions to generate a first shape model feature vector comprise instructions to apply the landmark detection information to a two-dimensional model of the first face.

3. The non-transitory computer readable medium of claim 2, wherein the instructions to generate a second shape model feature vector comprise instructions to apply the landmark detection information to a three-dimensional model of the first face.

4. The non-transitory computer readable medium of claim 1, further comprising instructions to generate normalized landmark detection information based, at least in part, on the landmark detection information.

5. The non-transitory computer readable medium of claim 4, wherein the instructions to generate a first texture model feature vector comprise instructions to generate a first texture model feature vector based, at least in part, on the normalized landmark detection information.

6. The non-transitory computer readable medium of claim 5, wherein the instructions to generate a first texture model feature vector comprise instructions to:
   identify a plurality of regions in the normalized landmark detection information, wherein the plurality of regions include less than all of the normalized landmark detection information; and
   generate a first texture model feature vector based on the plurality of regions.

7. The non-transitory computer readable medium of claim 5, wherein the instructions to generate a second texture model feature vector comprise instructions to:
   generate warped landmark detection information based, at least in part, on the normalized landmark detection information and a specified morphing operation; and
   generate a second texture model feature vector based, at least in part, on the warped landmark detection information.

8. The non-transitory computer readable medium of claim 5, wherein the instructions to generate a second texture model feature vector further comprise instructions to reduce the dimensionality of the second texture model feature vector before executing the instructions to combine the first texture model feature vector and the second texture model feature vector to form a first face feature vector.

9. The non-transitory computer readable medium of claim 1, wherein the instructions to obtain landmark detection information comprise instructions to obtain landmark detection information for the first face in the first image from a face detection operation.

10. The non-transitory computer readable medium of claim 1, wherein the instructions to combine the first shape model feature vector, the second shape model feature vector, the first texture model feature vector and the second texture model feature vector comprise instructions to concatenate the first shape model feature vector, the second shape model feature vector, the first texture model feature vector and the second texture model feature vector.

11. The non-transitory computer readable medium of claim 1, wherein the instructions to store the first face feature vector in a storage device comprise instructions to:
   incorporate the first face feature vector into metadata of the first image; and store the first image with the first face feature vector in a storage device.

12. An electronic device, comprising:
storage device having stored therein a plurality of images;
memory communicatively coupled to the storage device and having stored therein computer code in accordance with claim 1; and
a programmable control unit communicatively coupled to the storage device and the memory and configured to retrieve and execute the program code stored in the memory.

13. A non-transitory computer readable medium encoding instructions executable by a processor to:
obtain a landmark image for a first face in a first image, the landmark image identifying a plurality of aspects of the first face;
generate a normalized landmark image based, at least in part, on the landmark image;
generate a warped landmark image based, at least in part, on the normalized landmark image;
generate a first shape model feature vector based, at least in part, on the landmark image;
generate a second shape model feature vector based, at least in part, on the landmark image;
generate a first texture model feature vector based, at least in part, on the normalized landmark image;
generate a second texture model feature vector based, at least in part, on the warped landmark image;
combine the first shape model feature vector, the second shape model feature vector, the first texture model feature vector and the second texture model feature vector to form a first face feature vector;
store the first face feature vector in a storage device;
retrieve the first face feature vector from the storage device;
retrieve a second face feature vector from the storage device, wherein the second face feature vector corresponds to a known person;
compare the first face feature vector and the second face feature vector to generate a similarity value;
determine the first face corresponds to the known person if the similarity value indicates a match; and
determine the first face does not correspond to the known person if the similarity value does not indicate a match.

14. The non-transitory computer readable medium of claim 13, wherein the instructions to generate a first shape model feature vector comprise instructions to apply the landmark detection information to a two-dimensional model of the first face.

15. The non-transitory computer readable medium of claim 13, wherein the instructions to generate a second shape model feature vector comprise instructions to apply the landmark detection information to a three-dimensional model of the first face.

16. The non-transitory computer readable medium of claim 13, wherein the instructions to generate a first texture model feature vector comprise instructions to use a gradient vector operation on a plurality of regions in the normalized landmark image, wherein the plurality of regions comprise less than all of the normalized landmark image.

17. The non-transitory computer readable medium of claim 13, wherein the instructions to generate a second texture model feature vector, further comprise instructions to:
generate first and second descriptors based, at least in part, on the normalized landmark image;
generate a third descriptor based, at least in part, on the warped landmark image; and
combine the first, second and third descriptors to form the second texture model feature vector.

18. The non-transitory computer readable medium of claim 17, wherein the instructions to combine the first, second and third descriptors further comprises instructions to reduce the dimensionality of the combined first, second and third descriptors.

19. A computer system, comprising:
a storage device having stored thereon a plurality of images;
a memory operatively coupled to the storage device and having stored therein computer code in accordance with claim 13; and
a programmable control device communicatively coupled to the storage device and the memory and configured to execute the computer code stored in the memory.

* * * * *

UNITED STATES PATENT AND TRADEMARK OFFICE
CERTIFICATE OF CORRECTION

PATENT NO. : 8,593,452 B2  Page 1 of 1
APPLICATION NO. : 13/332084
DATED : November 26, 2013
INVENTOR(S) : Jan Erik Solem et al.

It is certified that error appears in the above-identified patent and that said Letters Patent is hereby corrected as shown below:

In the Claims

Claim 12, line 2 (Column 11, line 4) insert --a-- prior to "storage device".

Claim 12, line 3 (Column 11, line 5) insert --a-- prior to "memory".

Signed and Sealed this
Twenty-eighth Day of January, 2014

Michelle K. Lee
*Deputy Director of the United States Patent and Trademark Office*